United States Patent [19]

Burns et al.

[11] Patent Number: 4,672,162
[45] Date of Patent: Jun. 9, 1987

[54] ELECTRIC ARC APPARATUS FOR SEVERING SPLIT-PIN ASSEMBLIES OF GUIDE TUBES OF NUCLEAR REACTORS

[75] Inventors: David C. Burns, Trafford; Charles E. Kauric, Irwin; Joseph C. Persang, Pittsburgh, all of Pa.

[73] Assignee: Westinghouse Electric Corp., Pittsburgh, Pa.

[21] Appl. No.: 617,856

[22] Filed: Jun. 6, 1984

[51] Int. Cl.⁴ .................... B23K 9/00; G21C 19/00
[52] U.S. Cl. ........................ 219/69 R; 29/400 N; 29/426.4; 165/76; 219/69 D; 219/69 M; 219/69 V; 376/260; 376/353
[58] Field of Search ............ 219/69 R, 69 E, 69 M, 219/69 V, 68, 69 D; 165/76; 29/157.4, 400 N, 402.09, 402.16, 426.4; 376/260, 262, 353

[56] References Cited

U.S. PATENT DOCUMENTS

| | | | |
|---|---|---|---|
| 1,609,859 | 12/1926 | Bond | 219/70 |
| 2,427,588 | 9/1947 | Burnett | 219/69 E |
| 2,751,482 | 6/1956 | Stepath | 219/70 |
| 2,909,641 | 10/1959 | Kucyn | 219/69 E |
| 3,058,895 | 10/1962 | Williams | 219/69 E |
| 3,067,358 | 12/1962 | Maine | 219/69 D |
| 3,205,340 | 9/1965 | Gotch | 29/157.4 |
| 3,514,838 | 6/1970 | Freeborg | 29/426.4 |
| 3,644,983 | 2/1972 | Margala | 29/402.16 |
| 3,851,135 | 11/1974 | Moracz et al. | 219/69 D |
| 3,939,321 | 2/1976 | Bertrand et al. | 219/69 E |
| 3,986,245 | 10/1976 | Savor et al. | 29/157.4 |
| 4,243,484 | 1/1981 | Tsuji e al. | 29/400 N |
| 4,259,562 | 3/1981 | Cammann et al. | 219/69 V |
| 4,299,658 | 11/1981 | Meuschke et al. | 29/157.4 |
| 4,347,652 | 9/1982 | Cooper, Jr. et al. | 29/400 N |
| 4,406,856 | 9/1983 | Wilkins et al. | 376/260 |
| 4,470,896 | 9/1984 | Petitimbert | 219/69 E |
| 4,497,101 | 2/1985 | Schrader | 219/69 E |
| 4,534,932 | 8/1985 | Yoshikawa et al. | 376/353 |
| 4,537,711 | 8/1985 | Wilhelm et al. | 83/15 |
| 4,538,043 | 8/1985 | Alexander | 219/69 V |
| 4,547,944 | 10/1985 | Hayden | 29/157.4 |
| 4,572,816 | 2/1986 | Gjertsen et al. | 29/402.06 |
| 4,584,452 | 4/1986 | Zafred | 219/69 V |
| 4,590,671 | 5/1986 | Havoiz-Conroy | 29/400 N |

FOREIGN PATENT DOCUMENTS

| | | | |
|---|---|---|---|
| 3327726 | 2/1984 | Fed. Rep. of Germany | 376/260 |
| 55-31528 | 3/1980 | Japan | 219/69 R |
| 56-82126 | 7/1981 | Japan | 219/69 M |

OTHER PUBLICATIONS

Kisner, *EDM Digest*, Jul./Aug., 1981, pp. 6 and 7.
"Study on the Method of Machining a Standard Defect ...", by Oishi et al., *Bulletin of the Research Institute for Scientific Measurements*, vol. 23, No. 2-3, pp. 189-196, 08/1974.
"Edf Replaces Control Rod Guide Tubes", p. 2, *Nuclear Engineering International*, 11/1982.

*Primary Examiner*—A. D. Pellinen
*Assistant Examiner*—Geoffrey S. Evans
*Attorney, Agent, or Firm*—L. A. DePaul

[57] ABSTRACT

In the replacement of old split-pin assemblies of a guide tube of a nuclear reactor by new split-pin assemblies, each old split-pin assembly is severed into readily removable fragments by metal disintegration machining apparatus. This apparatus includes a metal disintegration machining tool having an electrode which is guided precisely into arc-disintegrating relationship with the assembly by a glass block in such a way that the assembly is successfully severed into fragments without damaging the guide tube. The electrode is progressively fed into the assembly producing the separation by arc disintegration as it penetrates. The electrode is axially perforated and water under pressure is injected into the arc region through the perforation. A hole is produced in the assembly disintegrating the assembly into a fragment which includes a portion of the nut with a portion of the pin threaded to it and the remaining portion of the pin. The entrance to the hole is a short distance, about 0.08 inch, above the adjacent surface of the guide tube. The hole terminates at a region below the level where the threading of the nut on the pin terminates but before it penetrates through the nut in this region. The skirt of the nut below the region where the threading terminates is about 0.40 inch long. The electrode is in a holder which has a flange which engages a stop on the block to stop the electrode before the arc penetrates through the nut.

18 Claims, 36 Drawing Figures

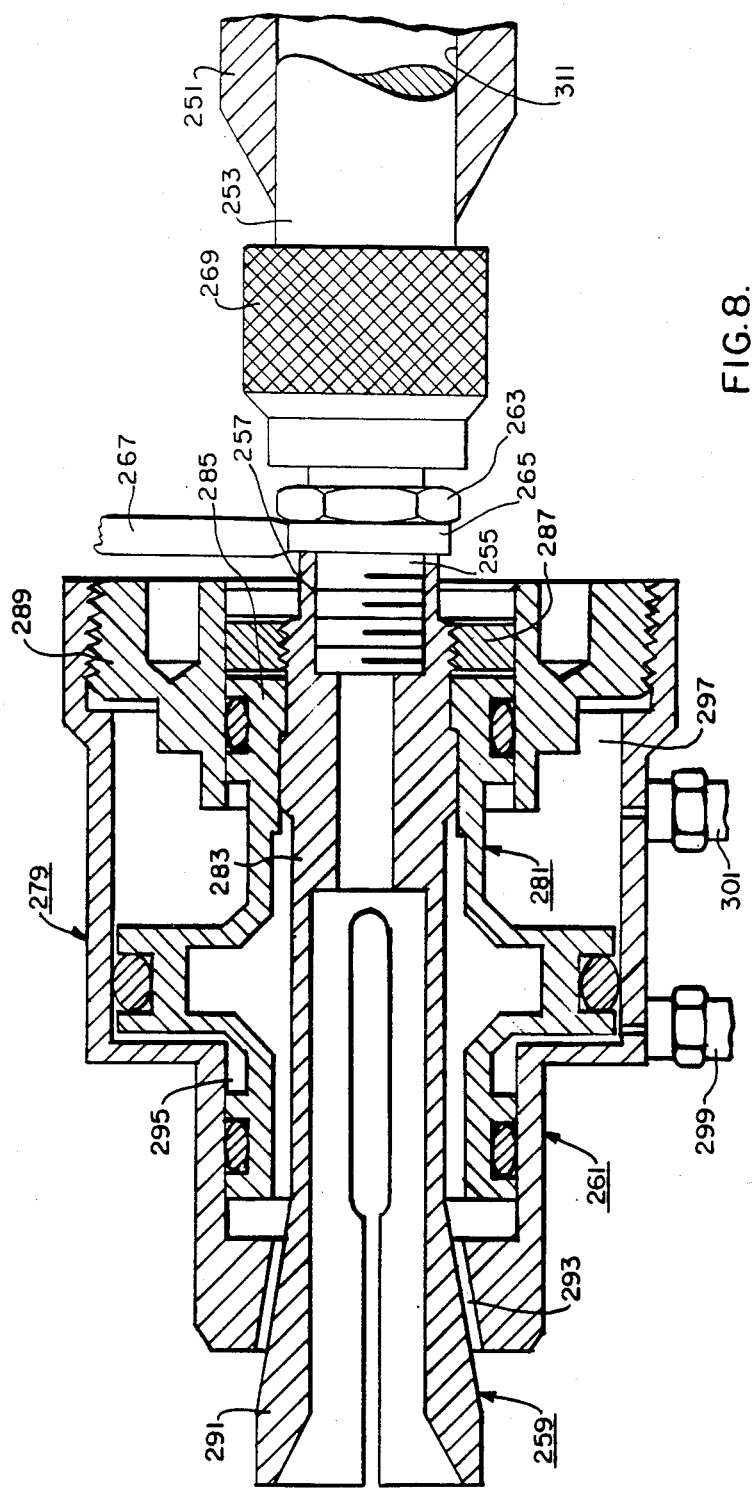

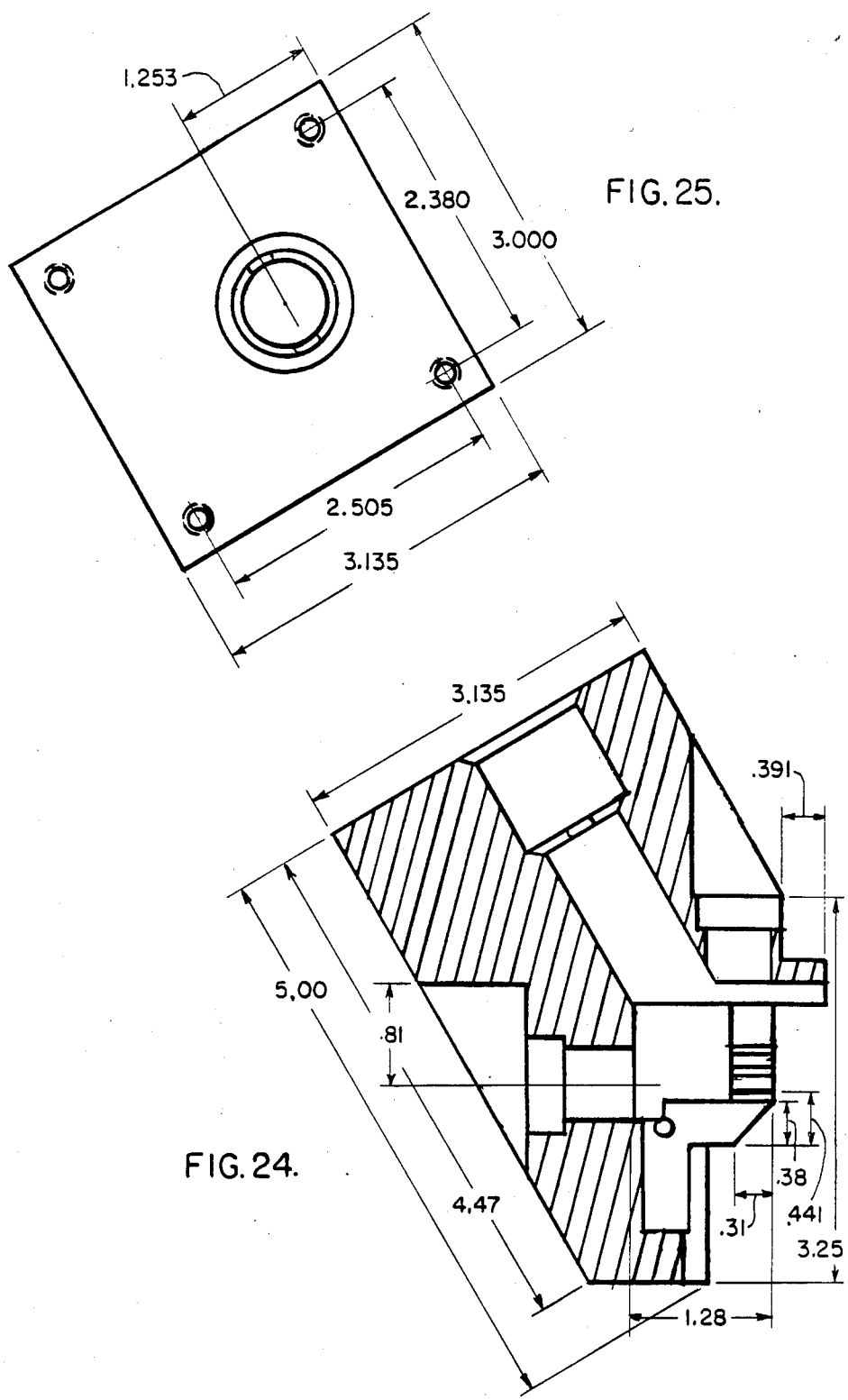

ELECTRIC ARC APPARATUS FOR SEVERING SPLIT-PIN ASSEMBLIES OF GUIDE TUBES OF NUCLEAR REACTORS

REFERENCE TO RELATED APPLICATION

Application Ser. No. 576,645, filed Feb. 3, 1984 to John L. Ford, Ronald J. Hoppine and Jose M. Matinez, for "Replacement Support Pin For guide Tubes for Operating Plants" and assigned to Westinghouse Electric Corporation is incorporated herein by reference.

Application Ser. No. 617,857, filed concurrently herewith to Raymond P. Calfo, Raymond M. Castner and George F. Dailey for "Replacement of Split Pins in Guide Tubes" (herein Calfo), assigned to Westinghouse Electric Corporation, is incorporated herein by reference.

BACKGROUND OF THE INVENTION

This invention relates to nuclear reactors and has particular relationship to the replacement of old split-pin assemblies by new split-pin assemblies in the guide tubes of reactors.

Typically, a guide tube includes an upper section and a lower section which is referred to as the lower guide tube (LGT). The split-pin assemblies are mounted in the lower flange of the LGT. For each split-pin assembly, the flange includes an upper counterbore and a lower counterbore. The split pin extends into the lower counterbore with its shank extending into the upper counterbore through a hole in a partition between the counterbores. The upper part of this shank is threaded. The split pin is held by a nut which is threaded onto the threaded shank and seats on the upper surface of the partition. When the nut is threaded onto the shank of the split pin, the split pin is drawn into the lower counterbore and its flange engages the lower surface of the partition between the counterbores. For various reasons, it has become necessary to replace the split-pin assemblies which were secured in the guide tubes in the past. The assemblies to be replaced are herein referred to as old split-pin assemblies. In the old split-pin assemblies, a dowel pin passes through the nut and is welded to the nut. A split-pin assembly extends into a vertical slot similar to a "mouse hole" in the wall of the guide tube. The part of this wall which extends above and bounds this slot limits the access to the split-pin assembly.

In the replacement of an old split-pin assembly by a new assembly, it is necessary that the old assembly be removed. Both the guide tube and the old assembly are highly radioactive and they must be processed in a pool of water. The guide tube is a massive complicated body of stainless steel. Its fabrication is highly time consuming and labor intensive and it is for this reason costly; typically, the cost is about $80,000. It is accordingly indispensable that the old split-pin assemblies be removed without damaging the guide tube. It is an object of this invention to accomplish such removal of the old split-pin assembly.

The nut and split pin of an old split-pin assembly cannot be separated by untorquing the nut because the nut is welded to the dowel pin. It has been proposed that the old split-pin assembly be removed by a remotely operation robotic saw. This expedient has proven not practicable because it demands a highly complicated operation difficult to carry out, without damaging the guide tube, particularly in the limited region near the slot in the guide. It is accordingly an object of this invention to provide apparatus and a method for removing an old split-pin assembly which shall effect the removal in a relatively uncomplicated manner and shall preclude damage to the guide tube.

SUMMARY OF THE INVENTION

In accordance with this invention, the old split-pin assembly is severed into readily removable fragments by a robotic metal disintegration machining tool which includes an electrode which forms a terminal of a disintegrating arc. The tool with its electrode and the split-pin assembly are under a pool of borated water. The electrode is fed axially (feeding mode) towards the workpiece at a constant preset rate. While the electrode is advancing feeding towards the workpiece it is also vibrating axially (vibrating mode) at approximately 60 C.P.S. typically. When the electrode moves close enough (vibrating mode) to the workpiece, so that the electrical potential exceeds the dielectric strength of the water, the arc is fired and passes between the end of the electrode and the workpiece. This arc causes a small particle of metal to be separated from the workpiece. As the electrode moves away (vibrating mode) from the workpiece the arc extinguishes. The metal particle is cooled, and is together with the gas generated, flushed away from the end of the electrode by a stream of water pumped through the end of the electrode and by suction of a far greater quantity of water produced by the suction system. The water flushed through the area moves at a high velocity and carries the debris and gas with it. The electrode then re-engages the workpiece and the above process is repeated.

The arc bores a hole through the assembly. The hole must meet two conditions: First, it must separate the assembly into fragments, one, an integral fragment, including what is left of the nut and the pin on which the nut is threaded and the other consisting of what is left of the remainder of the pin. Second, the hole must not include any part of the LGT or its flange.

To meet these conditions, reliance is placed on the fact that the internal thread of the nut begins well above the bottom rim of the nut so that as threaded onto the split pin, the nut has a skirt which is not threaded onto the pin. Typically, this skirt extends about 0.40 inch above the bottom rim of the nut.

The separation of the split-pin assembly into fragments, without damage to the flange, is achieved by feeding the electrode of the tool along a path at an angle defined by two points: a point where the arc is incident on the nut above the flange a sufficient distance to preclude damage to the flange of the guide tube and an end point below the region where the nut is threaded onto the pin but within the skirt of the nut.

When the electrode reaches the end point the arc, moved along this path, has cut through the entire cross section of the split pin, the assembly is severed into two fragments, one, including what is left to the nut and the part of the pin on which it is threaded, and the other, the remainder of the pin. Since the wall of the skirt is not penetrated, the flange is not damage. Typically, the incident arc is about 0.08 inch above the flange following the sparation. The power supply for the disintegrating arc typically operates between 19 and 21 volts and supplies current which varies between 25 to 50 amperes and 250 to 300 amperes as the electrode moves into and out of engagement with the old split-pin assembly. The positioning of the electrode is accomplished by an electrode guide block of non-metallic non-electrically conducting material, typically a high-softening-temperature glass. The guide block has a cavity whose internal surfaces are shaped so that the guide block seats precisely laterally on the nut and horizontally on the surface of the flange adjacent to the split-pin assembly. The guide block has a cylindrical hole which terminates at the cavity. The electrode is slideable in the hole at the above-defined angle so that the arc, between the electrode and the assembly, is incident at the proper distance above the LGT flange and at the end the arc is at a point where the pin has been cut through but the arc has not penetrated the skirt. The electrode has a flange which engages a shoulder in the hole at a position such that the movement of the electrode in the hole which is bored in the split-pin is stopped before the skirt is penetrated. The block has holes through which water is sucked in to flush the debris and gas out of the region of the arc.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 8 is a view in section taken along line VIII—VIII of FIG. 7;

FIGS. 23 through 31 are similar to FIGS. 9 through 13 but showing typical dimensions of a guide block in accordance with this invention. FIGS. 23 through 31 are presented for the purpose of aiding those skilled in the art to practice this invention and not with any intention of in any way limiting this invention.

DETAILED DESCRIPTION OF THE EMBODIMENT

Figure 16:
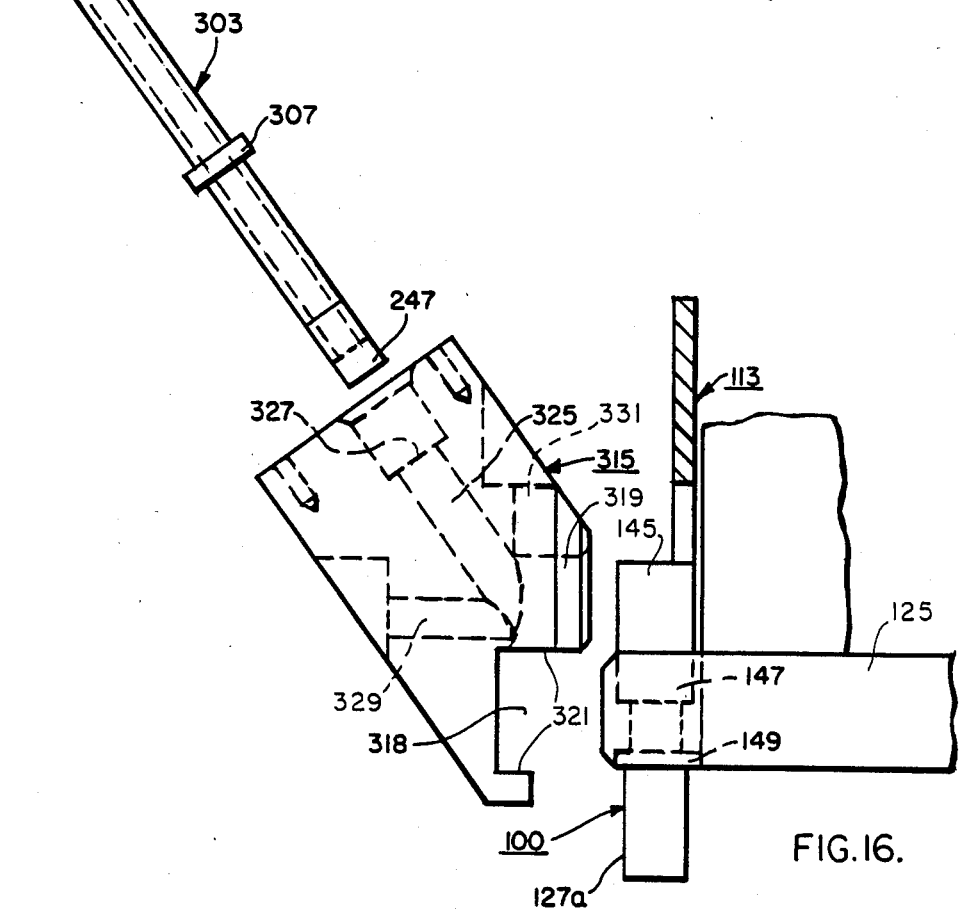
Figure 17:
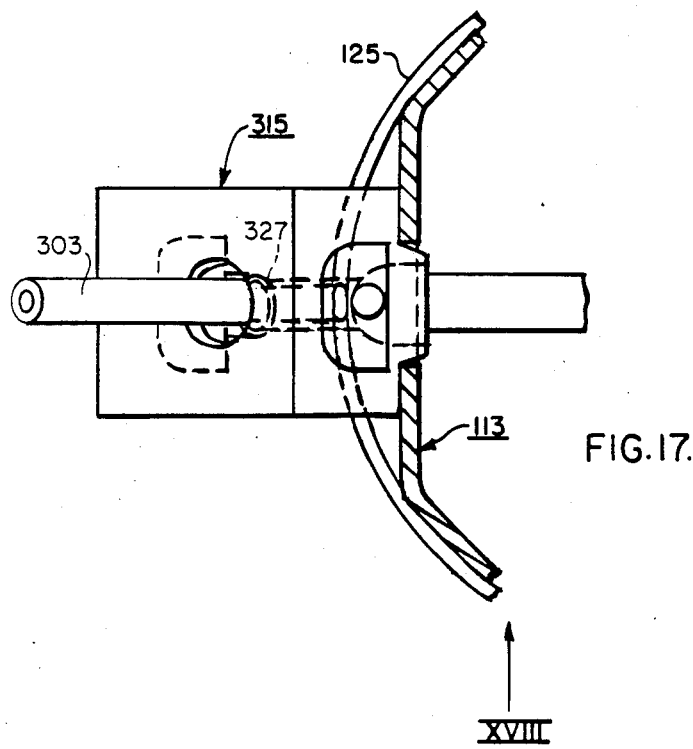
FIGS. 17 and 18 are respectively a plan view and a view in side elevation in the direction XVIII of FIG. 17, analogous to FIGS. 15 and 16, respectively, but showing the guiding block in engagement with the old split-pin assembly and flange.
Figure 18:
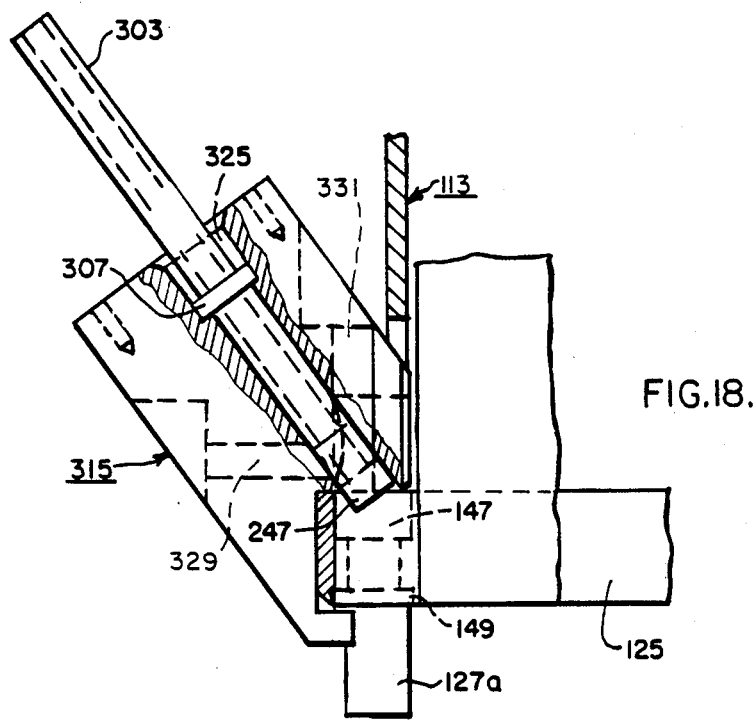
Figure 19:
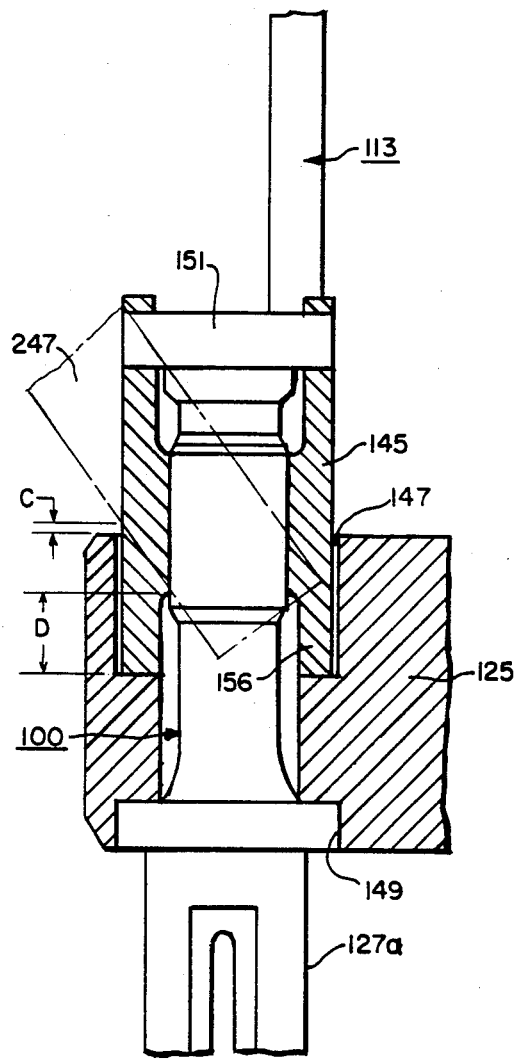
FIG. 19 is a diagrammatic view in section showing the manner in which the electrode of the tool according to this invention penetrates the old split-pin assembly.
Figure 22:
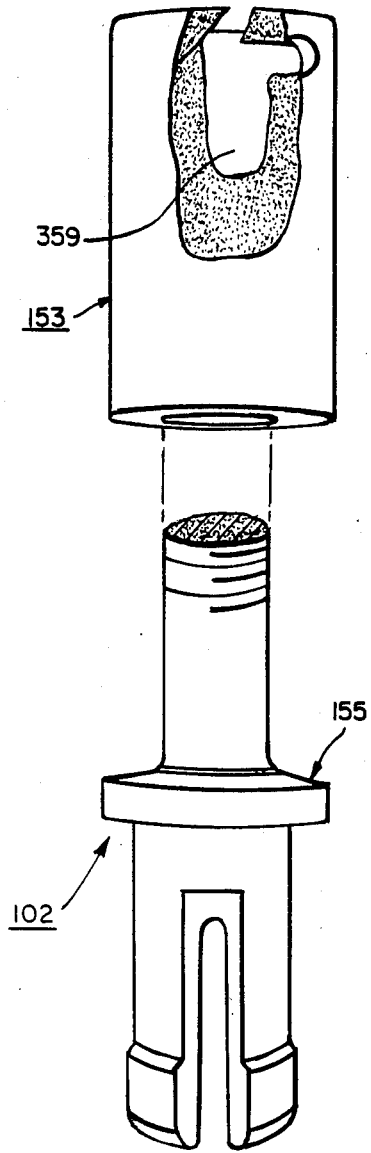
FIGS. 21 and 22 are photographs showing fragments, including the nut-and-pin fragment and the pin fragment, of the old split-pin assembly, produced by separation by the metal disintegration tool, as viewed in two directions generally at right angles to each other.
Figures 20, 21:
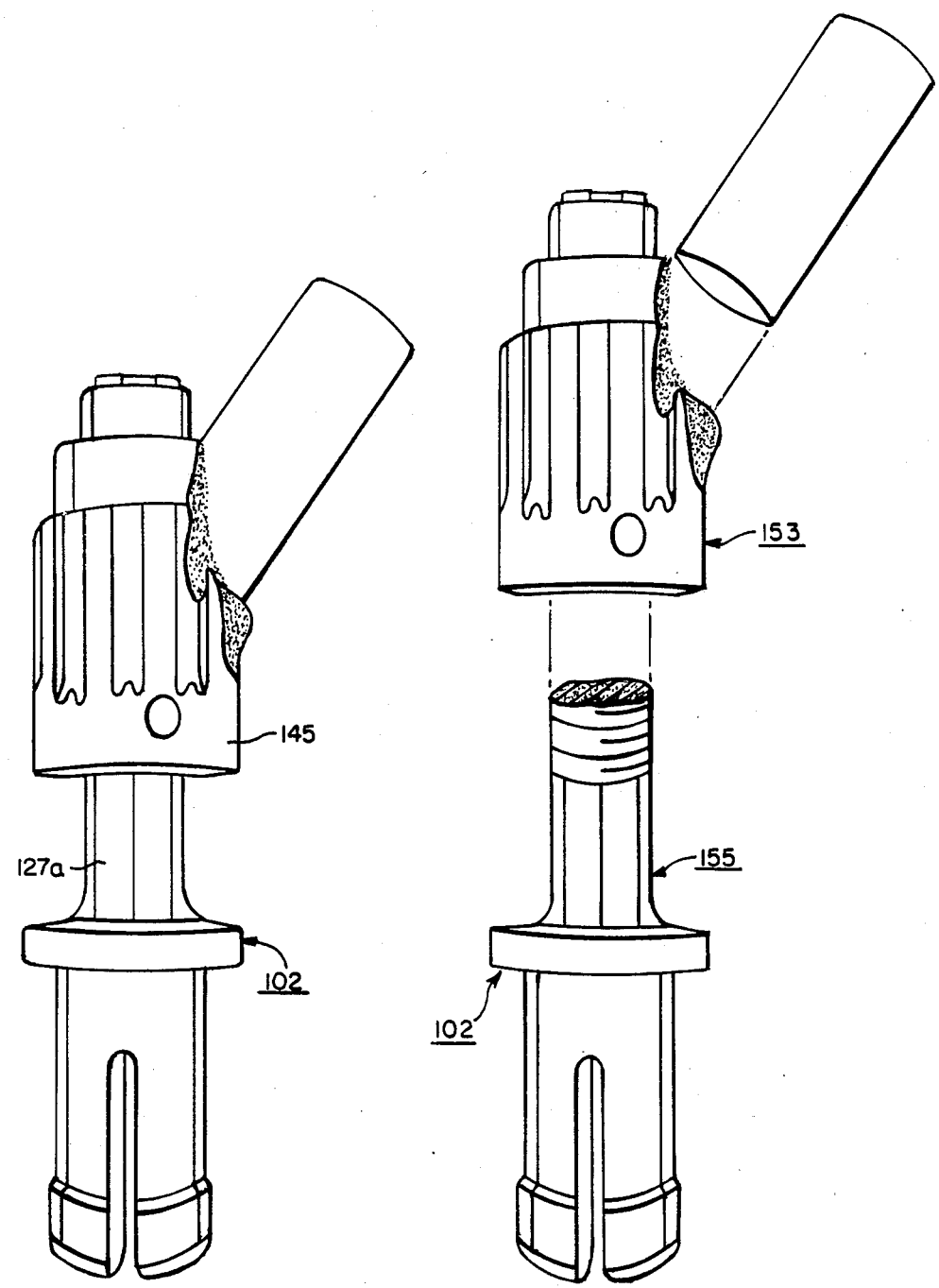
FIG. 20 is a photograph showing the relationship of the electrode and split-pin assembly in the practice of this invention.
Figure 23:
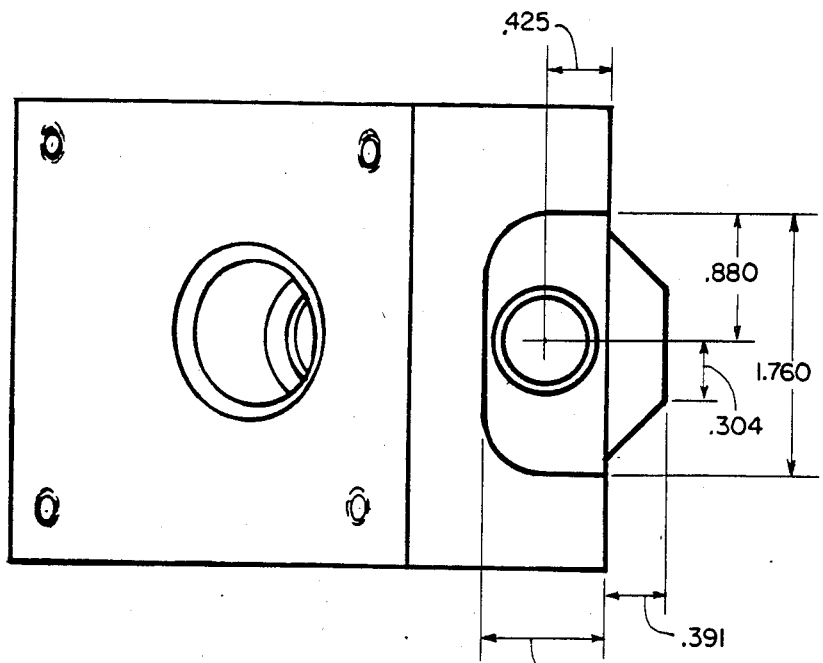
Figure 26:
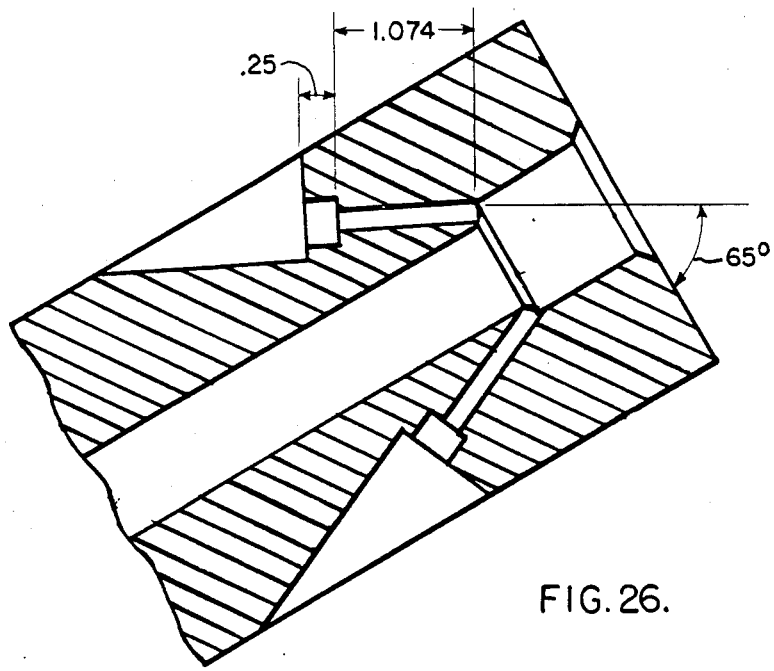
Figure 27:
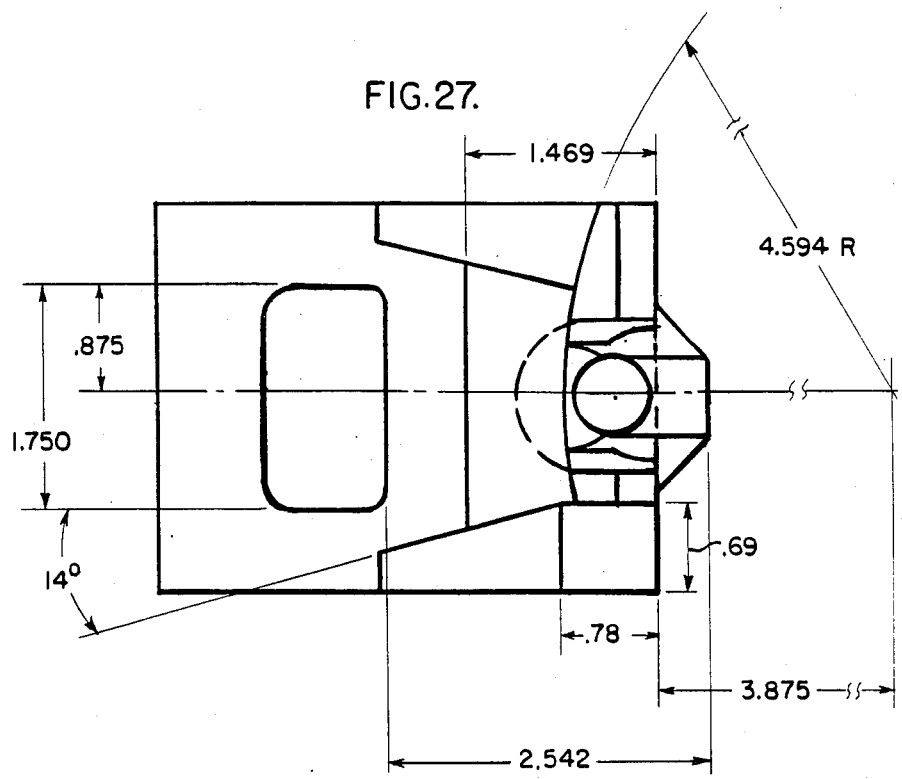
Figure 28:
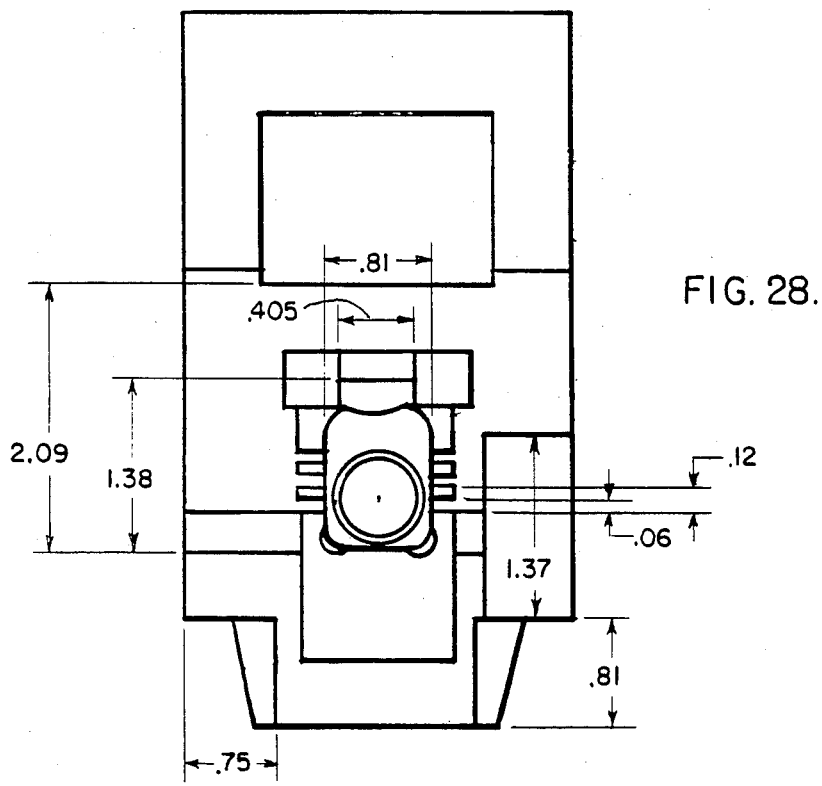
Figure 29:
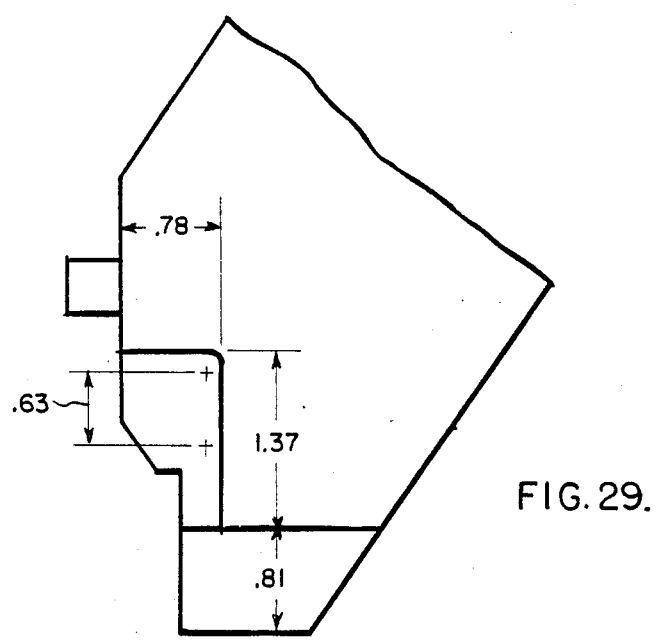
Figure 30:
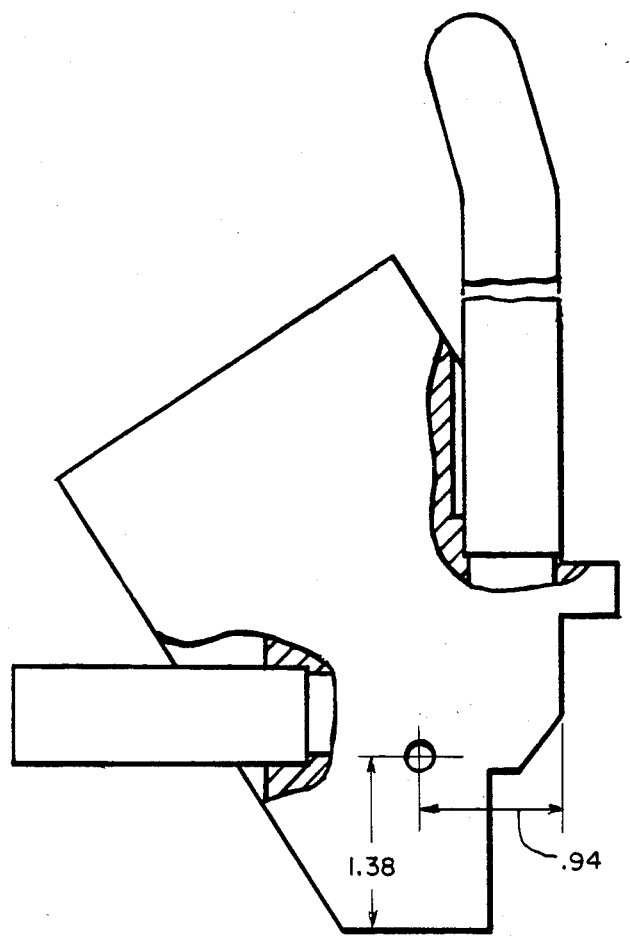
Figure 31:
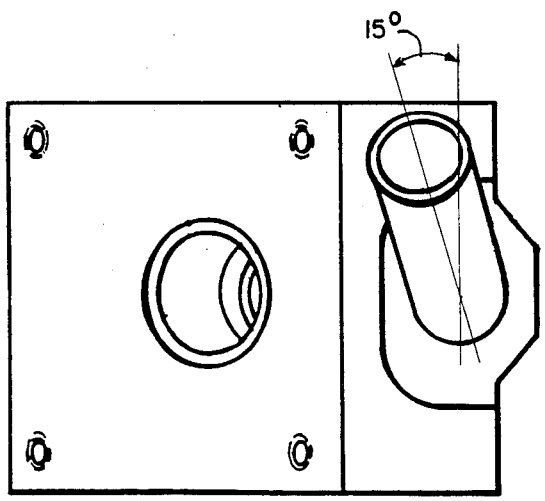

The apparatus provided in accordance with this invention serves to separate an old split-pin assembly 100 (FIGS. 1, 14–20) into readily removable fragments. As shown in more detail in Calfo, the assembly 100 includes a split pin 127a which is secured by a nut 145 in counterbores 147 and 149 of flange 125 of LGT113. A dowel pin 151 passes through to the top of the nut 145 and is welded to the nut locking the pin and nut together so that the assembly cannot be separated by untorquing the nut 145 and removing the nut and pin 127a separately. In the practice of this invention, the assembly 100 is separated by a metal disintegrating arc into two fragments 153 and 155 (FIGS. 21, 22): one, 153, including predominantly what is left of the nut 145 and the part of the pin 127a to which it is threaded and the other, 155, including predominantly the remainder of the pin. The part 153 is removable from the upper counterbore 147 and the part 155 is removable from the lower counterbore 149. (FIGS. 16, 18, 19) The separation is feasible because the nut 145 has a skirt 156 (FIG. 19) at the bottom which is not threaded to the nut. In producing the photographs of which FIGS. 20–22 are copies, the processing of a new split-pin assembly 102 which replaces the old split-pin assembly 100, as shown but thus showing is believed to be adequate for the purpose of illustrating the practice of this invention.

The apparatus according to this invention includes a metal disintegration machining tool (MDM) 213 (FIG. 1) a power supply and control unit 214 for the tool 213, a programmable computer 216, a suction filtration system 218 and a hydraulic system 220. The MDM and the suction filtration system are immersed in the reactor refueling pool 222 shown as a separate block. The power supply and control unit 214 is itself supplied from a generic power supply 224, usually a commercial power supply, at the site where the old split-pin assemblies are to be replaced. The power supply and control unit 214, the computer 216, the generic power supply 224, and the hydraulic system are located at a robotic command center above the pool 222 where the personnel taking part in the replacement are not subject to hazard from radioactivity. The electrical and fluid flow lines between the various components are labelled in FIG. 1 and their description need not be repeated in the text.

The MDM 213 includes a head 225 (FIGS. 1, 2, 3) within which a spindle 227 is mounted. A casing 229, sealed against penetration of water, is mounted on the head 225. The casing contains a motor (not shown) which drives the spindle 227 through a rack and pinion (not shown). The spindle 227 is movable relative to the head 225 and the parts connected to the head.

Figure 2:
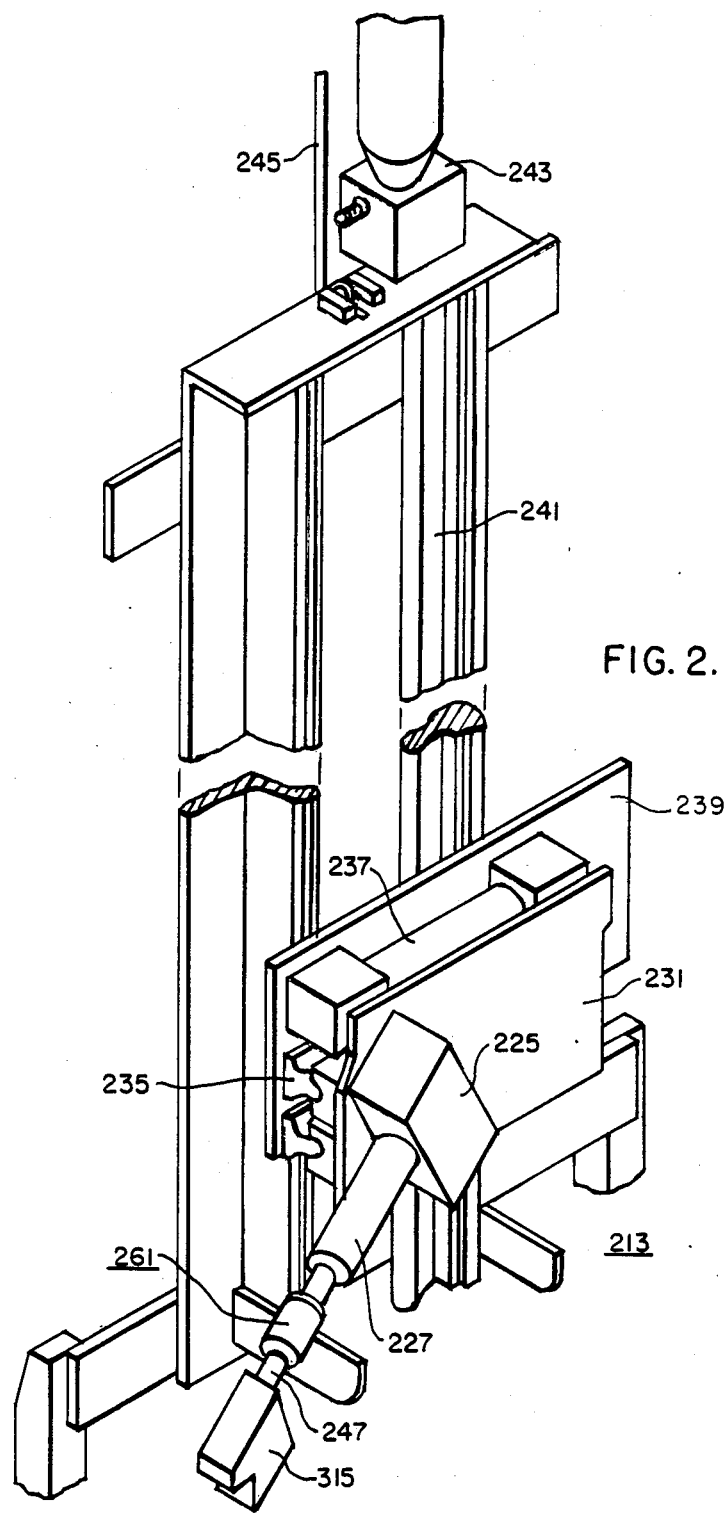
FIG. 2 is a simplified view in isometric, with parts omitted for clarity, showing a metal disintegration machining tool in accordance with this invention.

The head 225 and spindle 227 are mounted on carriage 231 (FIG. 2). The carriage 231 is movable generally horizontally on tracks 235 by a hydraulic cylinder 237 mounted on a plate 239. When a split-pin assembly is being severed, the plates 239 and the parts on it are submerged in the pool 222. The plate 239 is movable vertically on tracks 241 to the robotic control center by electric motor 243 through chain 245 so that the electrode 247 can be replaced.

Figure 7:
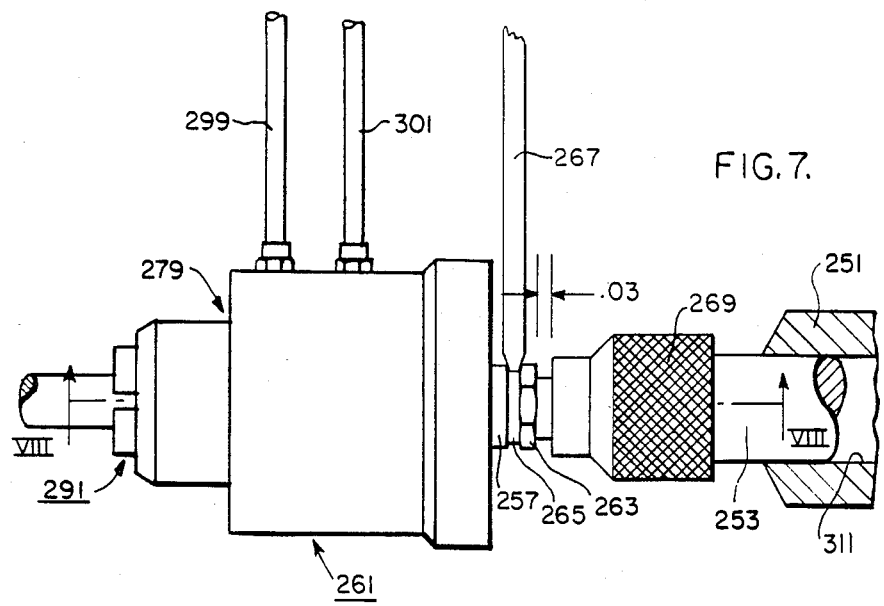
FIG. 7 is a view in side elevation of the hydraulic chuck for holding the electrode of the metal disintegration machining tool in accordance with this invention.
Figure 9:
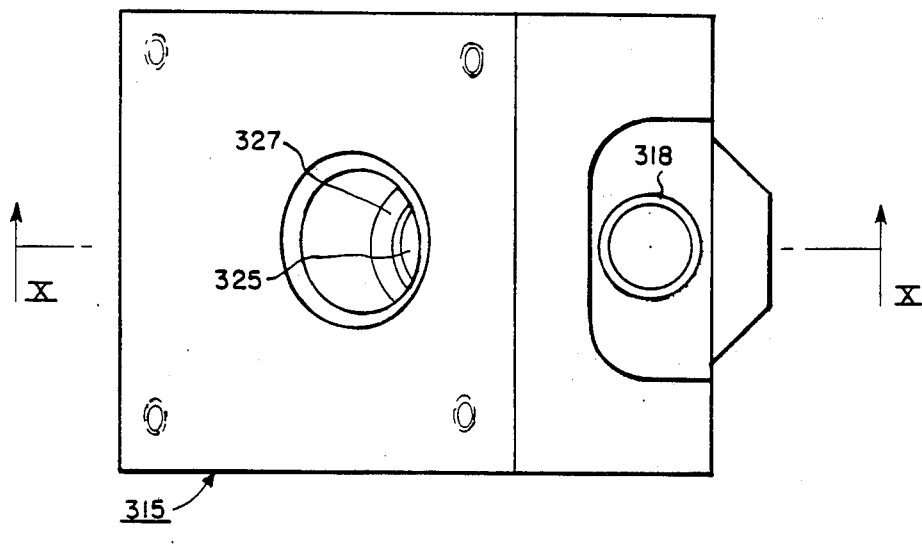
FIG. 9 is a plan view of the guiding block of the tool according to this invention taken in the direction IX of FIG. 10.

The spindle 227 is an elongated member from which a chuck 251 (FIGS. 3, 7) extends. The chuck 251 is herein sometimes referred to as the "spindle chuck". A cylindrical rod 253 is supported by the spindle chuck 251. At its end, the rod 253 carries a stud 255. The stud 255 is threaded onto a sleeve 257 from which the collet body 283 (FIG. 8) extends integrally outwardly. The collet body 283 terminates in the collet 259 of the electrode chuck 261. A jam nut 263 is threaded onto the stud 255 outwardly of the sleeve 257. The jam nut 263 tightens the terminal 265 of the power cable 267 against the sleeve 257. The spindle is vibrated by a magnet (not shown) by means of a circuit (not shown) similar to a conventional door bell circuit. A knurled nut 269 threaded on rod 253 controls the amplitude and frequency of the vibrations.

Figure 3:
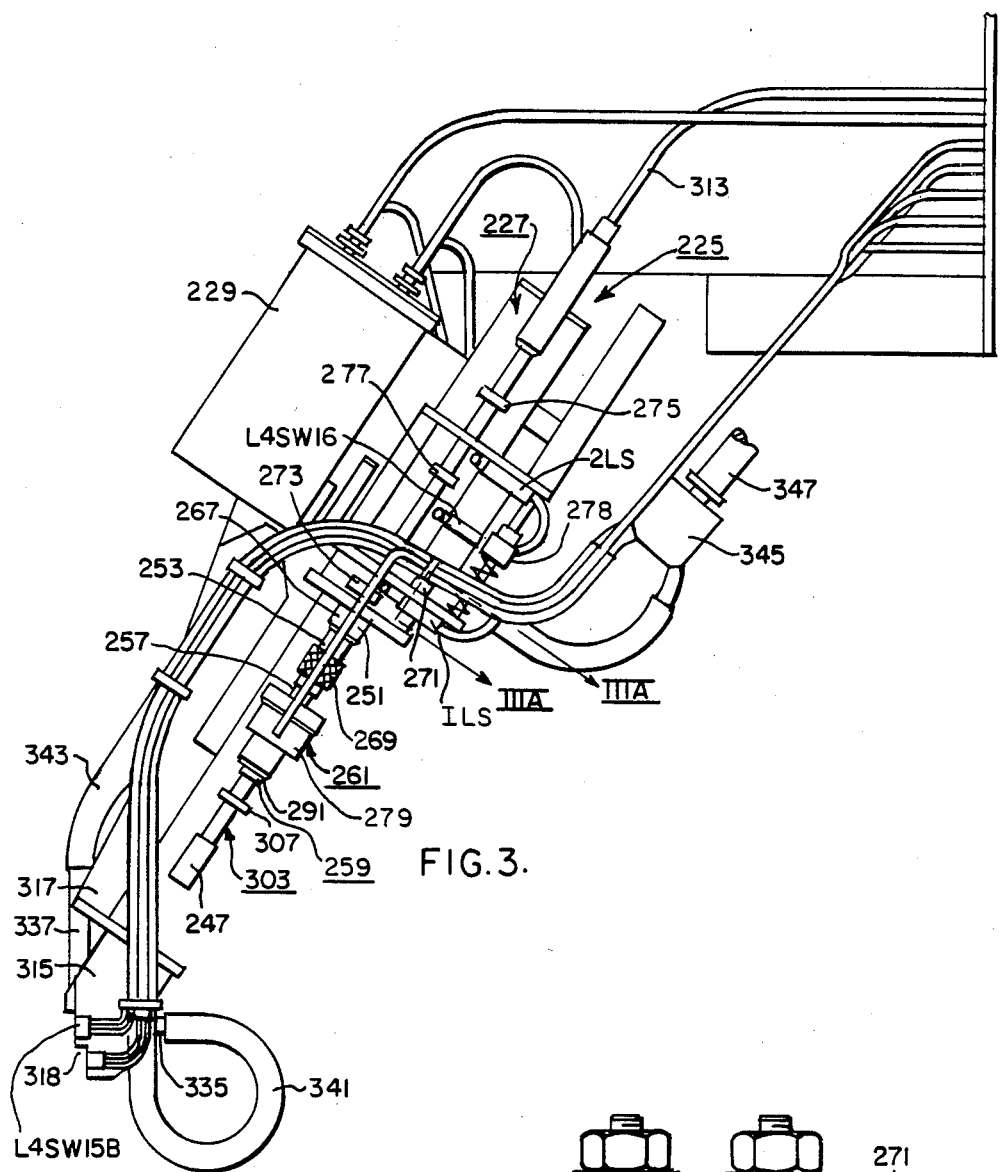
FIG. 3 is a view in side elevation of the apparatus including the metal disintegration machining tool shown in FIG. 2.
Figure 3A:
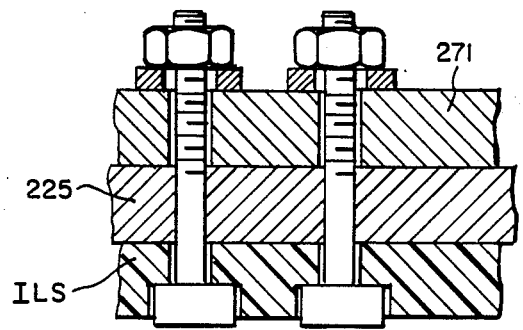
FIG. 3A is a view in section taken along line IIIA—IIIA of FIG. 3.

Limit switches 1LS and 2LS are connected by bracket 271 to the head 225 (FIGS. 3, 3A). The purpose of these switches 1LS and 2LS is described in Calfo. The bracket 271 also supports another limit switch L4SW16 whose function is to stop the inward motion of the spindle 227 and the electrode 247 when, after severing the pin 127a, the disintegrating arc has impinged on but not penetrated nut 145. The switches 1LS, 2LS and L4SW16 are actuated by actuators 273, 275, 277, respectively. The spindle drive motor may be overridden by mechanism 278.

Electrode chuck 261 (FIG. 8) includes, in addition to the collet or jaw 259, a housing or cylinder 279 and a piston 281. The collet 259, cylinder 279 and piston 281 are coaxial. The collet body 283 has an outward radial projection which engages an inward shoulder on the stem 285 of the piston 281. A lock nut 287 is threaded onto the body 283 inwardly of the sleeve 257. A ring-shaped cover 289 is threaded into the outer end of the cylinder 279. The leaves 291 of the collet 259 are externally tapered above the bottom. Below their tops but along the taper, the leaves pass through, and are spaced by a short spacing from an opening in the cylinder 279. The walls 293 of the opening have approximately the same taper as the leaves. There are separate annular cavities 295 and 297 between the cylinder 279 and the piston 281. Cavities 295 and 297 are supplied with fluid through hoses 299 and 301, respectively. The supply of fluid through hose 299 to cavity 295 moves cylinder 279 inwardly. The tapered surface 293 of this cylinder functions as a cam causing the leaves 291 to move into clamping setting. Supply of fluid to cavity 297 through hose 301 causes the cylinder to retract permitting the lever 291 to reset to non-clamping setting.

Figure 4:
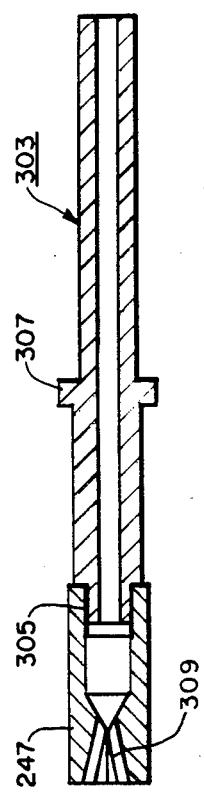
FIG. 4 is a view in longitudinal section of the electrode assembly of the metal disintegration tool shown in FIGS. 2 and 3.
Figure 5:
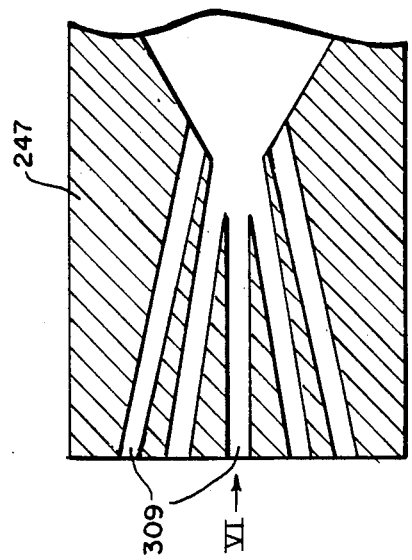
FIG. 5 is a fragmental view in longitudinal section, enlarged, showing the electrode of the electrode assembly shown in FIG. 4.
Figure 6:
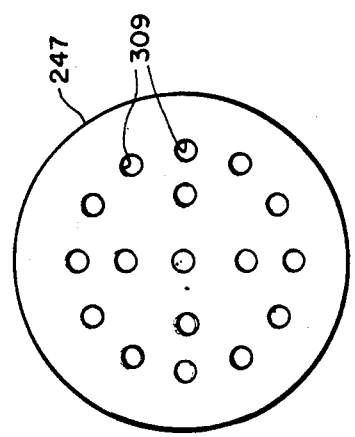
FIG. 6 is an end view of the electrode taken in the direction VI of FIG. 5.

The collet 259 supports the electrode assembly. The electrode assembly (FIGS. 4, 5, 6) includes a hollow cylindrical electrode holder 303 having an externally threaded tip 305 and having a flange 307 intermediate its ends. The electrode 247 has an internally threaded sleeve and is hollow for a portion of its length. Perforations 309 radiate from the end of this hollow portion of electrode 247. The sleeve is threaded onto tip 305 and the threaded joint is secured by epoxy resin. The spindle 227 has a hollow channel 311 (FIG. 7) along its length and the spindle chuck 251 and electrode chuck 261 are hollow. Water under pressure is injected into channel 311 through hose 313 and is emitted from the end of the electrode through perforations 309. Typically, the pressure is about 50 pounds per square inch and about $\frac{1}{2}$ gallon per minute of water flows out of the end of the electrode.

Figure 10A:
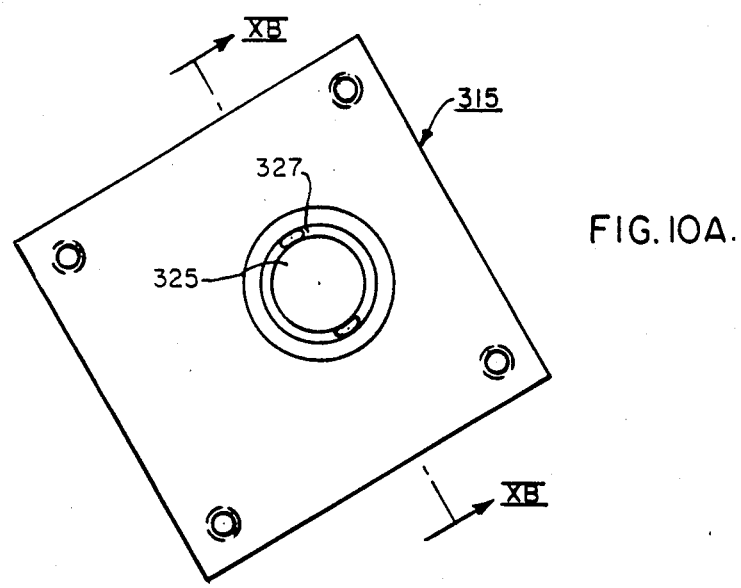
FIG. 10A is a view in end elevation taken in the direction XA of FIG. 10.
Figure 10:
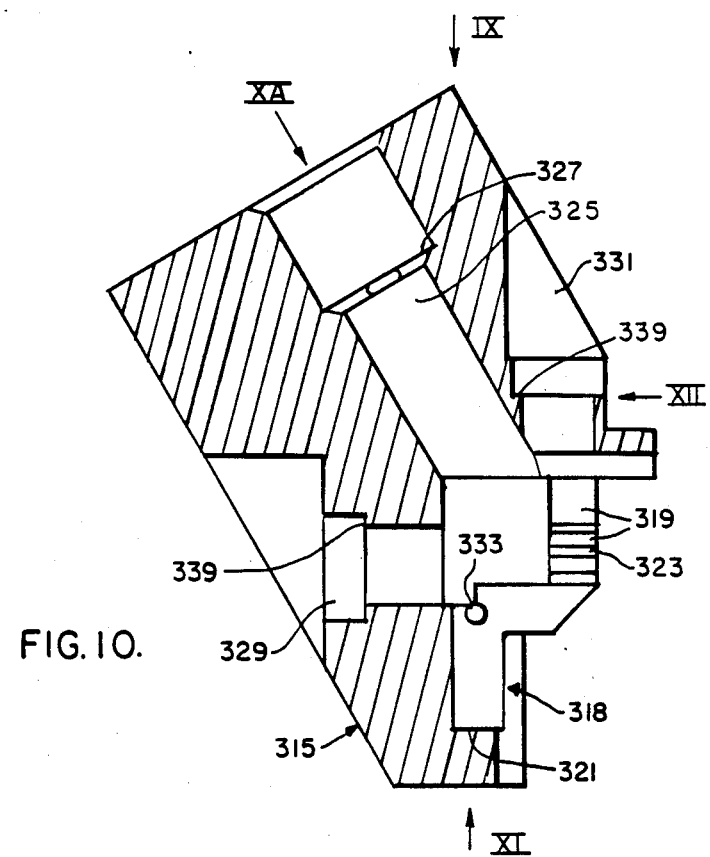
FIG. 10 is a view in section taken along line X—X of FIG. 9.
Figure 10B:
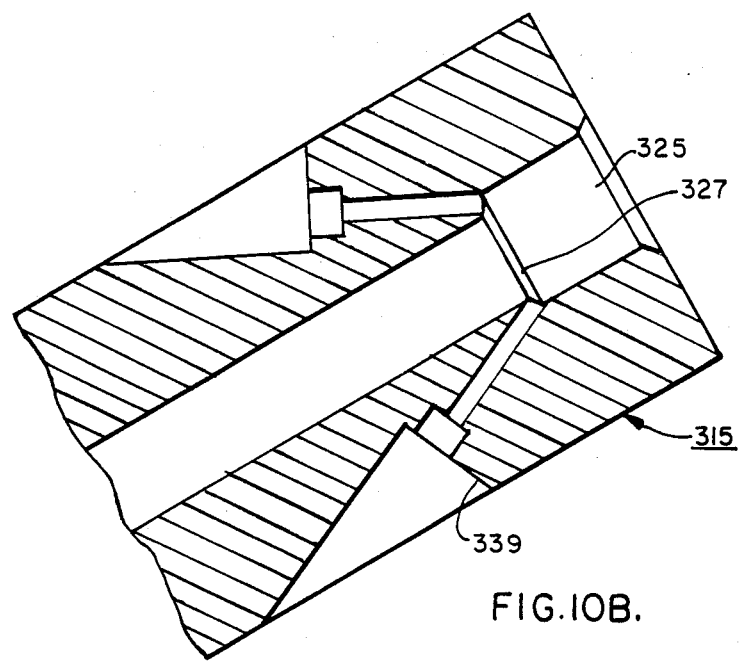
FIG. 10B is a view in section taken along line XB—XB of FIG. 10A.
Figure 11:
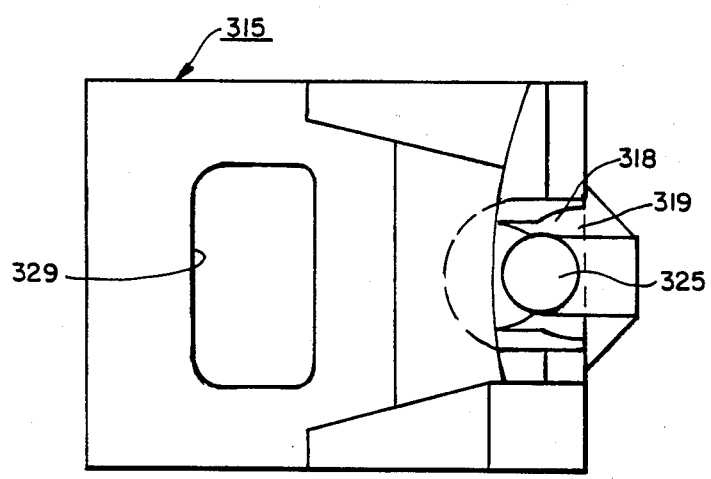
FIG. 11 is a plan view taken in the direction XI of FIG. 10.
Figure 12:
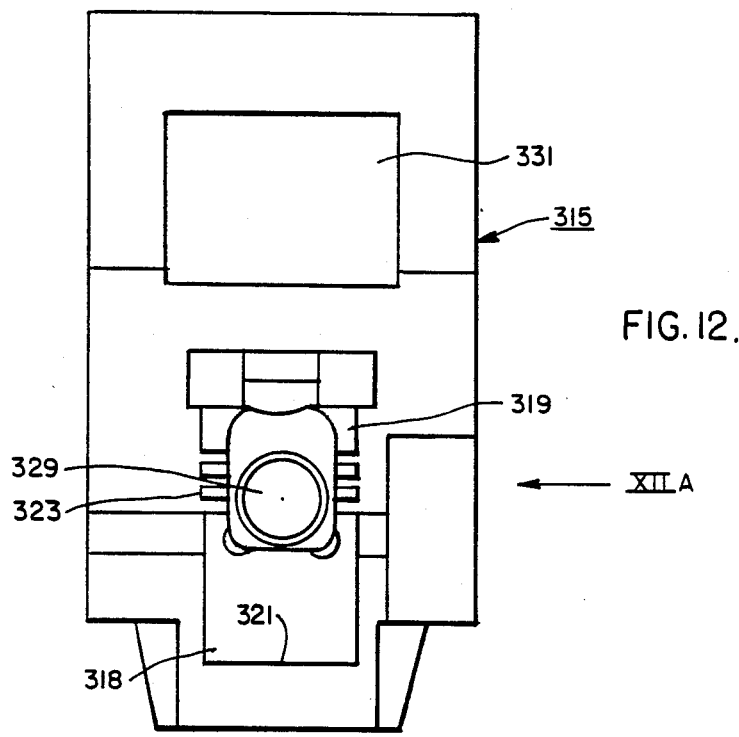
FIG. 12 is a view in end elevation taken in the direction XII of FIG. 10.
Figure 12A:
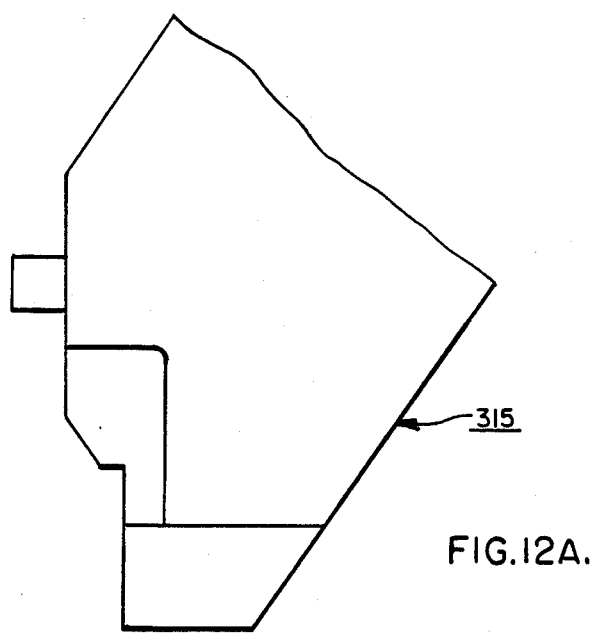
FIG. 12A is a fragmental view in side elevation taken in the direction XIIA of FIG. 12.
Figure 13:
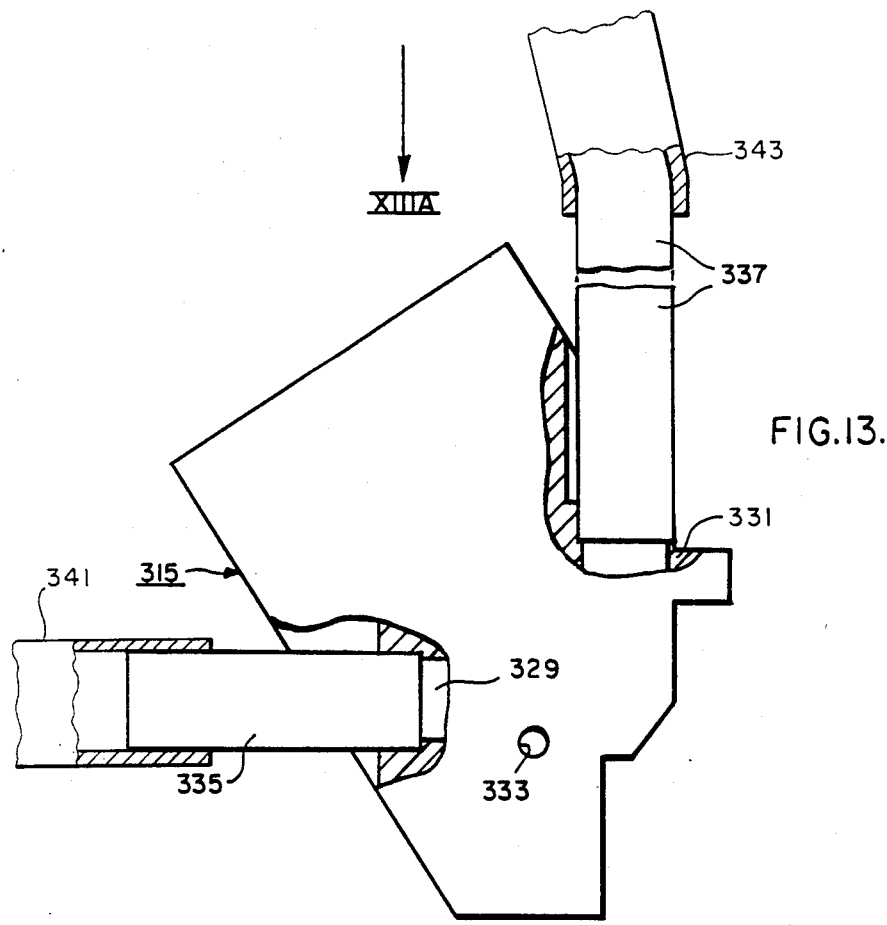
FIG. 13 is a view in side elevation showing the blocks and the pipes connected to it.
Figure 13A:
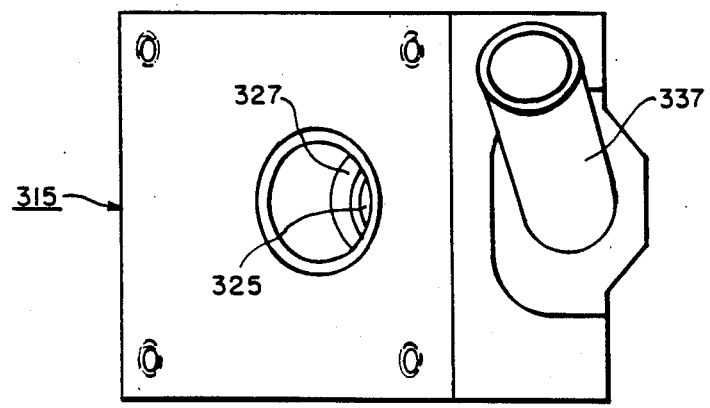
FIG. 13A is a view in side elevation taken in the direction XIIIA of FIG. 13.
Figure 14:
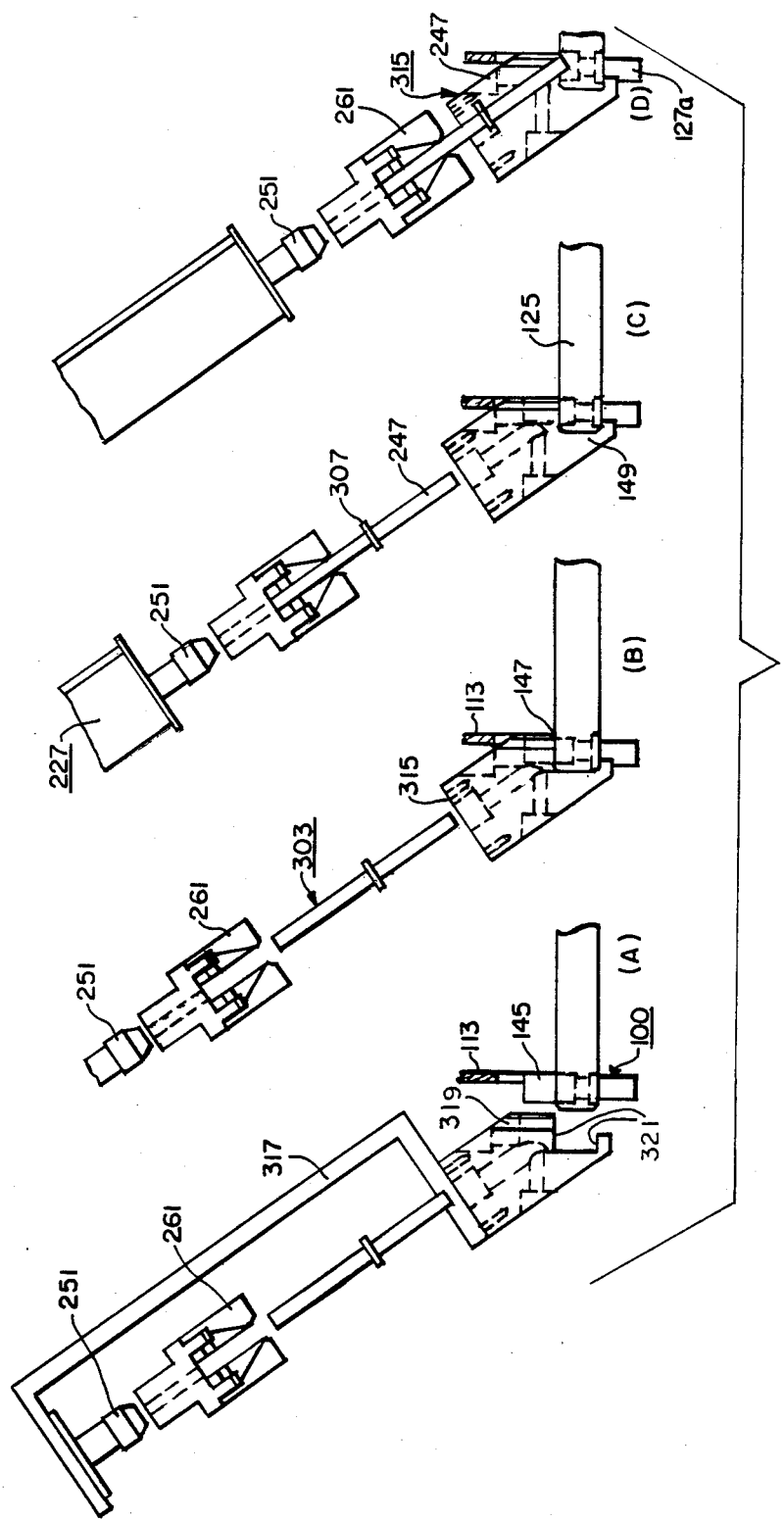
FIGS. 14(A), (B), (C), (D) is a diagrammatic view showing successive steps in the engagement of the metal disintegration tool in accordance with this invention with an old split-pin assembly and the flange in which the assembly is mounted.
Figure 15:
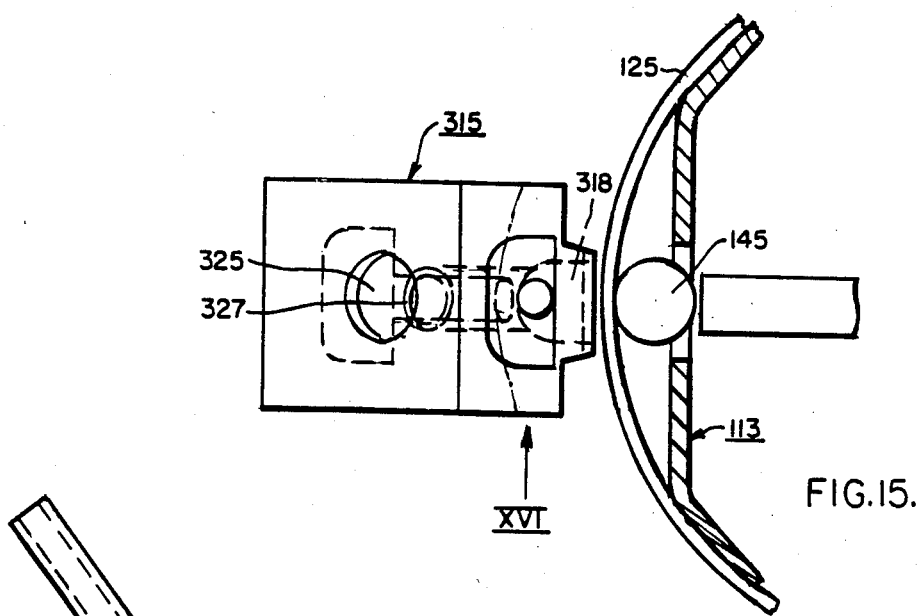
FIGS. 15 and 16 are respectively a plan view with the electrode assembly omitted, and a view in side elevation in the direction XVI of FIG. 15, showing the relationship of the guiding block of the tool according to this invention and an old split-pin assembly and the LGT flange just prior to engagement of the block and assembly and flange.

A non-metallic electrically insulating block 315 (FIGS. 3, 9–18) is supported on a bracket 317 (FIG. 3) extending from the head 225. The block 315 has a cavity 318 having vertical and horizontal walls 319 and 321 (FIG. 10) shaped to seat against the nut 145 of an old split-pin assembly 100 and against the adjacent surface of the LGT flange 125. Limit switches L4SW15 and L4SW14A and L4SW15B (only L4SW15B shown) are mounted on the lower end of block 315 (FIG. 3). The actuation of L4SW15B signals that the block 315 is properly seated on the surface of the flange 125 extending from the upper counterbore through which the nut 145 extends. Actuation of switches L4SW14B and/or 14A signals that block 315 is properly seated laterally against the side wall of the flange 125 (See Calfo). The surface 319 of the block 315 which seats against the nut 145 has ridges 323 (FIGS. 10, 12). The block 315 has a cylindrical hole 325 which terminates inwardly at the surface of the nut 145 against which the block 315 seated. The hole 325 is expanded at the top providing a shoulder 327. The electrode 247 and the part of the holder 303 below the flange 307 are dimensioned to slide in the hole 325 while being maintained substantially coaxial with the hole. The hole 325 is at such an angle that an electrode 247 is incident on the nut 145 a distance C (FIG. 19) above the flange 125 which is long enough to preclude damage to the flange. The hole is also at such an angle that at the end of the burning operation the arc has penetrated completely through the old split-pin 127a above the lower rim of the skirt 156. The skirt has a length D. Typically C is about 0.08 inch and D 0.40 inch. The inward movement of the electrode is stopped by the engagement of the flange 307 with the shoulder 327 (FIG. 10). The hole 325 is so dimensioned that the electrode is stopped when its top reaches the inner surface of the skirt 156 (FIG. 19) but does not penetrate the skirt. During the separation operation, the pin is engaged by the pin puller and expeller 328 (FIG. 1) (see Calfo). Once the pin 127 is burned through the pin puller and expeller pulls out the pin fragment 153 (FIGS. 21, 22). The nut fragment 155 is removed by a pick-and-put tool (see Calfo).

Figure 1:
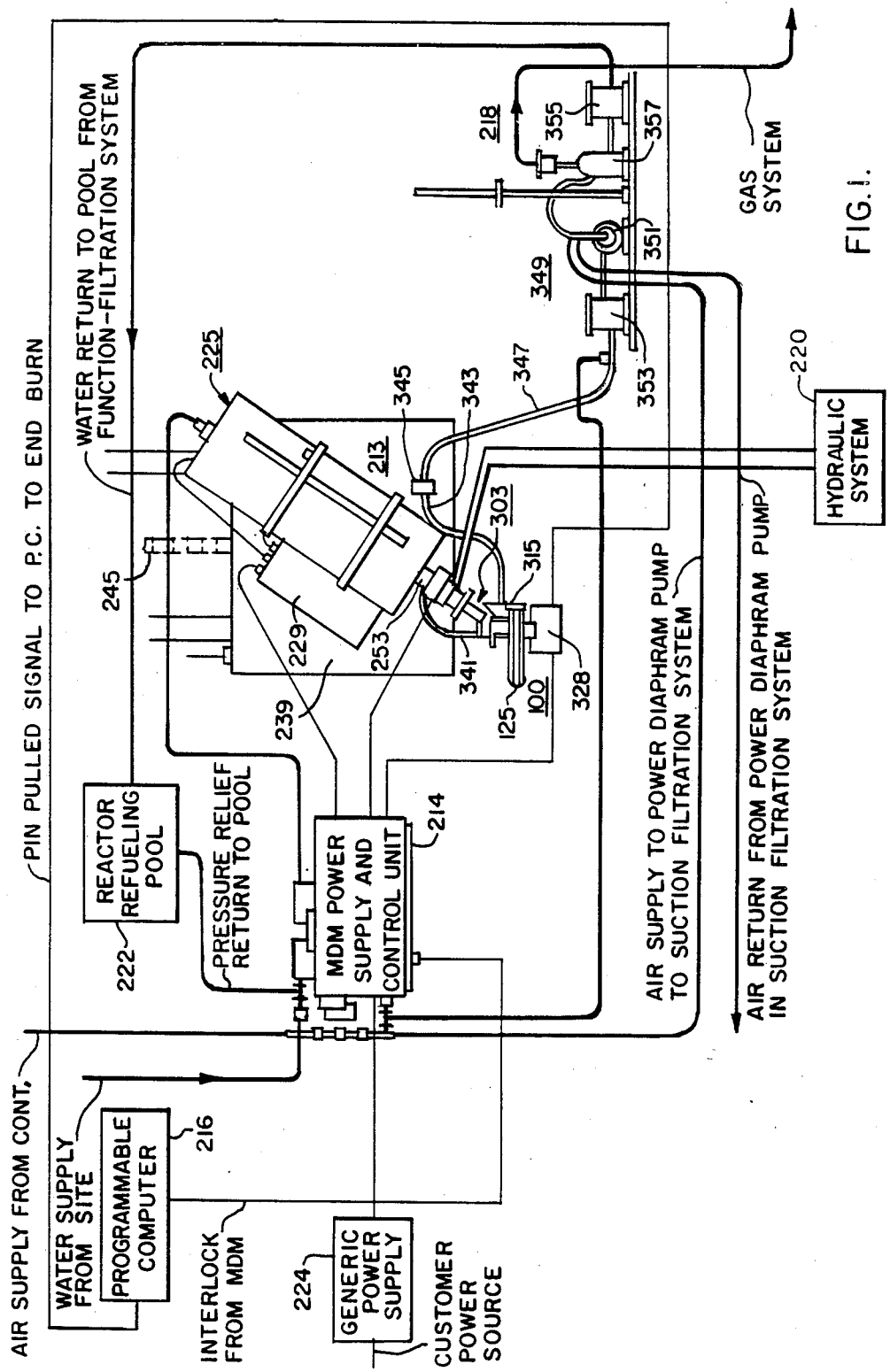
FIG. 1 is a diagrammatic view showing apparatus in accordance with this invention for separating an old split-pin assembly into readily removable parts.

Holes 329 and 331 (FIG. 10) penetrate through opposite side walls of the block 315. The axes of the holes are approximately at right angles to each other and at 45° to the axis of the hole 325 and electrode 247 and holder 303. The holes 329 and 331 terminate in the region of cavity 318 where the arc is fired. There are also holes 333 (FIGS. 10, 13) on opposite sides of the block 315 which also terminate in the cavity 318 where the arc is fired. Pipes 335 and 337 (FIG. 13) extend into the holes 329 and 331 resting against shoulders 339 between the inner and outer parts of the holes. Hoses 341 and 343 (FIG. 3) are connected to the pipes 335 and 337. Outwardly, the hoses terminate in a Y-block or manifold 345 (FIGS. 1, 3) from which a common conductor 347 extends. The common conductor is connected to the suction filtration system 349 (FIG. 1). The pipes 335 and 337, the hoses 341 and 343, the Y-block 345, the common hose 347 and the suction filtration system are all submerged in the pool 222.

The suction filtration system 349 (FIG. 1) includes a suction pump 351, filtration tanks 353 and 355 and a gas separator 357 interposed between the tanks. The tank 353 contains cartridges for separating out the larger radioactive particles (typically 50 micron minimum size) from the disintegration of the old split-pin assembly 100 and the tank 355 contains cartridges for separating out the residual small particles (typically 5 micron minimum size).

The gas separator 357 separates out the gas from the water. The gases are predominantly hydrogen, oxygen; the quantities of tritium also included are not sufficient to cause concern for radiation hazard. On the completion of an MDM operation or at longer intervals, the tops are removed from the tanks 353 and 355 with a long-handled tool. The cartridges are then removed and disposed of in a trash chute with another long-handled tool. The gas from the separator 357 is transferred to a waste facility in the containment of the reactor.

During the severance of the split-pin assembly 100, the radius of the hole 359 (FIG. 22) which is bored in the assembly is only 0.020 inch to 0.025 inch greater than the radius of the electrode 247. The suction of pump 351 must be adequate to withdraw the water from the small gap between the electrode 247 and the hole and there must be adequate water to remove the debris accumulation. The debris accumulation is removed by the action of pump 351 which is a high-volume diaphragm pump. The pump performs two principle functions: first, it sucks in the water of the pool 222 through the holes or ports 329 and 331 and the holes 333. This water flushes the debris from the end of the electrode where the arc produces the disintegration. The debris is conducted with the water through the filters 353 and 355 and the gas separator 357 (FIG. 1). The ports 329 and 331 are of large diameter. Second, it sucks in water through the clearances between the nut 145 and the surfaces 319 and 321 of the cavity 318 of the guide block 315, particularly the clearances between the ridges 323 in wall 319 (FIGS. 10, 13) and the holes 333. These clearances are dimensioned large so that the volume of water sucked in from the pool 222 is large; typically about 4 to 10 times the volume pumped through the perforations 309 in the electrode or about 2 to 5 gallons per minute. With a high total volume of water sucked from the pool, the speed of, and force exerted by, the water which flows through the hoses 343, and 347 and the manifold 345, the tanks 353 and 355 and the gas separator 357 is high. The solid particles (debris) and the gas bubbles are maintained well in the flow.

While an embodiment of this invention has been disclosed herein, many modifications thereof are feasible. This invention is not to be restricted except insofar as is necessitated by the spirit of the prior art.

We claim:

1. Apparatus for use in the replacement of an old split-pin assembly of a guide tube of a nuclear reactor by a new split-pin assembly, said old split-pin assembly including an old split pin and an old nut securing said old split pin to said guide tube, said old split-pin assembly and said guide tube being radioactive, the said apparatus including a metal disintegration machining tool, said tool having an electrode, means for mounting said tool submerged in a pool of water in engagement with said guide tube and with said old split-pin assembly secured to said guide tube, said tool being so mounted with said electrode in position to coact electrically with said last-named old split-pin assembly but not with said guide tube, and means, connected to said tool, for firing a disintegrating arc between said electrode and said assembly to disintegrate said assembly into readily removable fragments.

2. The apparatus of claim 1 wherein the engagement of the metal disintegration machining tool with the guide tube and the old split-pin assembly is effected through a guiding block, said block including a channel for guiding the electrode into arc-disintegrating relationship with the assembly without damage to the guide tube.

3. In the replacement of an old split-pin assembly of a guide tube of a nuclear reactor by a new split-pin assembly, said old split-pin assembly including an old split-pin and an old nut securing said old split pin to a flange of said guide tube, said old nut being threaded onto said old split pin and a skirt of said old nut, not threaded to said old split pin, extending inwardly of said flange beyond the region where said old nut is threaded to said old split pin, the method of severing said old split-pin assembly into readily recoverable fragments without damage to the guide tube to whose flange said old split-pin assembly is secured, the said method being practiced with a metal-disintegration machining tool having an electrode, the said method comprising, positioning the electrode of said metal-disintegration machining tool at an angle to said old nut of said old split-pin assembly threaded to the old nut, firing an arc between said electrode and said old nut so as to disintegrate the metal of said old nut and the metal of the old split pin threaded to the old nut, the said electrode being positioned so that said arc is outwardly of the outer surface of said flange on its entrance side of said arc a sufficient distance to preclude damage to said flange, advancing the electrode through said old split-pin assembly disintegrating the metal of said old nut and old split-pin as it advances, and interrupting said arc after said arc has passed through said old split pin and into the old nut, but before the arc passes through said old nut on the side of said old split-pin assembly opposite said entrance side.

4. A metal disintegration machining tool for separating an old split-pin assembly secured to a flange on the guide tube of a nuclear reactor into readily-removable fragments, the said assembly including a split pin secured to said guide tube by a nut, the tool including an electrode, means for advancing said electrode in arc-disintegrating-relationship through said old split-pin assembly to be separated into readily removable fragments, and guiding block of electrically insulating material, connected to said electrode and to be connected to said assembly for guiding said electrode as it is advanced in arc-disintegrating-relationship through said old split-pin assembly, said guiding block having surfaces, subtending the region of said electrode where the arc is fired, for engaging said nut of said assembly and said flange near the region where said assembly is secured, said surfaces being positioned so that said old split-pin assembly is readily separated into fragments by arc disintegration without damage to said guide tube.

5. The metal disintegration machining tool of claim 4 wherein the surfaces of said guiding block subtending the region of the electrode where the arc is fired, form the inner surface of a cavity in said block, said inner surface being formed to engage the nut of said old split-pin assembly, said block being mounted movable with said tool into and out of engagement with said old split-pin assembly, said block also having an opening communicating with the cavity at the inner end of said opening, the electrode passing through said opening into said cavity in position to form the terminal of a disintegrating arc between the electrode and the old split-pin assembly, said electrode being movable in said opening relative to said block, and said tool also including means, connected to said electrode, for advancing said electrode through said opening so as to disintegrate said old split-pin assembly progressively along the path of said electrode when an arc is fired between said electrode and contiguous parts of said old split-pin assembly.

6. Apparatus for use in the replacement of an old split-pin assembly of a guide tube of a nuclear reactor by a new split-pin assembly, said old split-pin assembly including an old split pin and an old nut securing said old split pin to a flange on said guide tube, said old nut being threaded onto said old split pin and a skirt of said old nut, not threaded to said old split pin, extending inwardly of said flange, said old split-pin and said guide tube being radioactive; the said apparatus including a metal disintegration machining tool having an electrode, means for mounting said tool submerged in a pool of water in engagement with said old nut of said old split-pin assembly secured to said guide tube, said tool being mounted with said electrode in position to coact electrically with said old split-pin assembly, and means, connected to said tool, for firing a disintegrating arc between said electrode and said old nut, said mounting means including means for positioning said tool so that said electrode is at an angle such that the arc produces a hole in said old nut and said old split pin of said old split pin assembly, which hole extends through said old nut, outwardly of the upper surface of the guide tube, on the entrance side of the arc and penetrates over a region extending to a region below the unthreaded portion of said old nut but not through said old nut, whereby said assembly is disintegrated into readily removable fragments, without damage to said guide tube, one fragment including predominantly a portion of said old nut and the portion of said old split pin threaded to it and another fragment includes predominantly the remaining portion of said old split pin.

7. The apparatus of claim 6 wherein the metal disintegration machining tool includes a block having a cavity, the inner surfaces of said cavity being formed to engage the old nut and the portion of the flange of the guide tube to which the old nut secures the old split pin, which portion is adjacent to the old nut, said block being mounted on said tool and being movable with said tool into and out of engagement with said flange and old nut, said block also having an opening communicating with said cavity, the electrode passing through said opening into said cavity in position to form the terminal of a disintegrating arc between the electrode and said old nut, said electrode being movable in said opening relative to said block, and said tool also including means, connected to said electrode, for advancing said electrode through said opening so as to disintegrate said old split-pin assembly progressively along the path of said electrode when said arc is fired between said electrode and contiguous parts of said old split-pin assembly, said inner surfaces of said cavity being precisely formed so that when said surfaces are in engagement with said old nut and flange, said electrode progresses precisely through said old split-pin assembly producing the hole in said old split-pin assembly without damage to the guide tube.

8. The apparatus of claim 7 wherein the block includes at least one cavity in addition to the cavity into which the electrode penetrates, said at least one additional cavity being accessible to the gap between said electrode and said old nut, and means to be connected to said at-least one additional cavity for evacuating the debris and gas generated by the arc from the region of the arc.

9. The apparatus of claim 6 wherein the metal disintegration machining tool includes a guiding block through which the old nut and the old split-pin assembly are engaged, said block including a channel for guiding the electrode in arc-disintegrating relationship with the assembly without damage to the guide tube.

10. Apparatus for use in the replacement of an old split-pin assembly of a guide tube of a nuclear reactor by a new split-pin assembly, said old split-pin assembly and said guide tube being radioactive, the said apparatus including a metal disintegration machining tool, said tool having an electrode, means connected to said tool, for mounting said guide tube, said old split-pin assembly and said tool submerged in a pool of water with said electrode in position to establish a disintegrating arc within said pool, between said electrode and said old split-pin assembly to be replaced, means, connected to said electrode, for firing a disintegrating arc between said electrode and said last-named assembly to sever said last-named assembly into readily removable fragments, and means, connected to said tool, for flushing the region of said arc with water of said pool to remove the debris created by the severing of said last-named assembly, the said flushing means including a guiding block having a channel for guiding said electrode as it severs said assembly and also including channel means lateral of said electrode-guiding channel for conveying the water flushing said region of said arc.

11. The apparatus of claim 10, including means, connected to the electrode, for conveying water to the arc through said electrode.

12. The apparatus of claim 11 wherein the channel means lateral of the electrode-guiding channel is so dimensioned that the flushing means has a capacity for conveying substantially more water for flushing the region of the arc than the capacity of the means for conveying water through the electrode to said arc.

13. The apparatus of claim 12 wherein the channel means has the capacity of conveying between 4 and 10 times the quantity of water through the arc of the quantity conveyed by the means for conveying water through the electrode to the arc.

14. A metal disintegration machining tool for separating an old split-pin assembly secured to a flange on the guide tube of a nuclear reactor into readily-removable fragments, the said split-pin assembly including a split pin secured to the flange of the guide tubes by a nut, the tool including an electrode, means for advancing said electrode in arc-disintegrating-relationship through said old split-pin assembly to be separated into fragments, and a guiding block of electrically insulating material, connected to said electrode and to be connected to said old split-pin assembly for guiding said electrode, as it is advanced in acr-disintegrating-relationship through said old split-pin assembly, so that said old split-pin assembly is separated into fragments by arc disintegration without damage to said guide tube, the said guiding block having a cavity, the inner surface of said cavity being formed to engage the old nut of said old split-pin assembly and also to sit on the surface of said flange of said guide tube adjacent said nut, said guiding block being mounted movable with said tool into and out of engagement with said nut, said guiding block also having an opening communicating said cavity at the inner end of said opening, said electrode passing through said opening into said cavity in position to form the terminal of a disintegrating arc between said electrode and said old split-pin assembly, said electrode being movable in said opening relative to said guiding block, said tool also including means, connected to said electrode, for advancing said electrode through said opening so as to disintegrate said old split-pin assembly progressively along the path of said electrode when an arc is fired between said electrode and contiguous parts of said old split-pin assembly, the inner surface of said cavity being so precisely formed that by the engagement of said surface with said nut and its seating on said flange, said electrode, when it penetrates into said cavity, is precisely positioned to separate said old split-pin assembly into said readily-removable fragments without damage to said guide tube.

15. The metal disintegration machining tool of claim 14 wherein the cavity includes means, cooperative with the electrode, for stopping the advance of the electrode inwardly of the old split-pin assembly before the nut is penetrated by the arc on the inward movement of the electrode causing damage to the guide tube.

16. The metal disintegration machining tool of claim 14 wherein the electrode is mounted and extends from an electrode holder which is movable with the electrode through the opening in the block, said electrode holder having a flange and said opening having a shoulder, the engagement of said flange and said shoulder stopping the movement of said electrode inwardly of the old split-pin assembly preventing the penetration of the arc through the nut on the side remote from the entrance of the electrode through the nut.

17. A metal disintegration machining tool for separawting an old split-pin assembly secured to a flange on the guide tube of a nuclear reactor into readily-removable fragments, the said assembly including a split pin secured to said flange of said guide tube by a nut, the said tool including an electrode, means for advancing said electrode in arc-disintegrating-relationship through said old split-pin assembly to be separated into fragments, and a guiding block of electrically insulating material, connected to said electrode and to be connected to said assembly, for guiding said electrode, as it is advanced in arc-disintegrating-relationship through said old split-pin assembly, so that said old split-pin assembly is separated into fragments by arc disintegration without damage to said guide tube, said guiding block having a cavity, the inner surface of said cavity being formed to engage said nut of said old split-pin assembly, said guiding block being mounted movable with said tool into and out of engagement with said nut, said guiding block also having an opening communicating with said cavity at the inner end of said opening, said electrode passing through said opening into said cavity in position to form the terminal of disintegrating arc between said electrode and said old split-pin assembly, said electrode being movable in said opening relative to said guiding block and said tool also including means, connected to said electrode, for advancing said electrode through said opening so as to disintegrate said old split-pin assembly progressively along the path of said electrode when an arc is fired between said electrode and contiguous parts of said old split-pin assembly, said guiding block also including means, cooperative with said electrode, for stopping the advance of said electrode inwardly of said old split-pin assembly before said nut of said old split-pin assembly is penetrated by said arc on the inward movement of said electrode, causing damage to said guide tube.

18. A metal disintegration machining tool for separating an old split-pin assembly secured to a flange on the guide tube of a nuclear reactor into readily-removable fragments, the said old split-pin assembly including a split pin secured to the flange of the guide tube by a nut, the tool including an electrode, means for advancing said electrode in arc-disintegrating-relationship through said old split-pin assembly to be separated into fragments, and a guiding block of electrically insulating material, connected to said electrode and to be connected to said assembly, for guiding said electrode, as it is advanced in arc-disintegrating-relationship through said old split-pin assembly, so that said old split-pin assembly is separated into fragments by arc disintegration without damage to said guide tubes, said guiding block having a cavity, the inner surface of said cavity being formed to engage the nut of said old split-pin assembly, said block being mounted movable with said tool into and out of engagement with said old split-pin assembly, said guiding block also having an opening communicating with said cavity at the inner end of said opening, said electrode passing through said opening into said cavity in position to form the terminal of a disintegrating arc between said electrode and said old split-pin assembly, said electrode being movable in said opening relative to said block, and said tool also including means, connected to said electrode, for advancing said electrode through said opening so as to disintegrate said old split-pin assembly progressively along the path of said electrode when an arc is fired between said electrode and contiguous parts of said old split-pin assembly, said electrode being mounted on, and extending from, an electrode holder which is movable with said electrode through said opening in said block, said electrode holder having a flange and said opening being bounded by a surface having a shoulder, the engagement of said flange of said electrode holder and said shoulder stopping the movement of said electrode inwardly of said old split-pin assembly during the arc disintegration of said split-pin assembly and preventing the penetration of said arc through said nut of said old spring-pin assembly on the side remote from the entrance of said electrode through said old split-pin assembly.

* * * * *